United States Patent
Onishi et al.

(10) Patent No.: US 10,128,741 B2
(45) Date of Patent: Nov. 13, 2018

(54) POWER CONVERSION DEVICE

(71) Applicant: Mitsubishi Electric Corporation, Chiyoda-ku (JP)

(72) Inventors: Ryota Onishi, Chiyoda-ku (JP); Toshiyuki Fujii, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 65 days.

(21) Appl. No.: 15/035,575

(22) PCT Filed: Apr. 18, 2014

(86) PCT No.: PCT/JP2014/061053
§ 371 (c)(1),
(2) Date: May 10, 2016

(87) PCT Pub. No.: WO2015/093072
PCT Pub. Date: Jun. 25, 2015

(65) Prior Publication Data
US 2016/0294276 A1 Oct. 6, 2016

(30) Foreign Application Priority Data
Dec. 16, 2013 (JP) .................. 2013-259049

(51) Int. Cl.
*H02M 7/217* (2006.01)
*H02M 7/483* (2007.01)
(Continued)

(52) U.S. Cl.
CPC ............ *H02M 1/36* (2013.01); *H02J 7/022* (2013.01); *H02M 7/217* (2013.01); *H02M 7/483* (2013.01);
(Continued)

(58) Field of Classification Search
CPC ............ H02M 7/217; H02M 7/219; H02M 2007/4835; H02M 1/36; H02M 7/42;
(Continued)

(56) References Cited

U.S. PATENT DOCUMENTS

2011/0013441 A1* 1/2011 Gruber .................. H02M 1/36
363/154
2011/0019449 A1 1/2011 Katoh et al.
(Continued)

FOREIGN PATENT DOCUMENTS

EP 2 549 634 A1 1/2013
EP 2 645 552 A2 10/2013
(Continued)

OTHER PUBLICATIONS

Office Action dated Feb. 28, 2017 in Japanese Patent Application No. 2015-553385 (with partial English language translation).
(Continued)

*Primary Examiner* — Timothy J Dole
*Assistant Examiner* — Ivan Laboy Andino
(74) *Attorney, Agent, or Firm* — Oblon, McClelland, Maier & Neustadt, L.L.P.

(57) ABSTRACT

Each phase arm of a power conversion device includes at least one converter cell connected in series. For each converter cell, an element driving unit is provided which turns on one switching element in the converter cell as a startup element. The element driving unit is supplied with power from a DC capacitor, and when voltage of the DC capacitor exceeds startup voltage Vsh, turns on the startup element. Thus, at the time of startup of the power conversion device, the DC capacitor in each converter cell is initially charged to desired voltage.

16 Claims, 12 Drawing Sheets

(51) Int. Cl.
*H02M 7/49* (2007.01)
*H02M 1/36* (2007.01)
*H02J 7/02* (2016.01)

(52) U.S. Cl.
CPC ...... *H02M 7/49* (2013.01); *H02M 2007/4835* (2013.01)

(58) Field of Classification Search
CPC .......... H02M 7/44; H02M 7/48; H02M 7/483; H02M 7/49; H02M 7/493; H02M 7/537; H02M 7/5375; H02M 7/5387; H02M 7/797; H02J 3/36
See application file for complete search history.

(56) References Cited

U.S. PATENT DOCUMENTS

| | | |
|---|---|---|
| 2013/0208519 A1 | 8/2013 | Yamamoto et al. |
| 2014/0097804 A1* | 4/2014 | Hasler ................. H02J 3/18 320/166 |
| 2014/0146586 A1 | 5/2014 | Das et al. |
| 2016/0028303 A1* | 1/2016 | Chataignere ............ H02M 1/36 320/107 |

FOREIGN PATENT DOCUMENTS

| | | |
|---|---|---|
| JP | 2010-57337 A | 3/2010 |
| JP | 2011-24392 A | 2/2011 |
| JP | 2011-142740 A | 7/2011 |
| JP | 2011-193615 A | 9/2011 |
| JP | 2013-81309 A | 5/2013 |
| JP | 2013-121282 A | 6/2013 |
| WO | 2012/140008 A2 | 10/2012 |
| WO | 2012/159668 A1 | 11/2012 |

OTHER PUBLICATIONS

International Search Report dated Jun. 24, 2014 in PCT/JP14/061053 Filed Apr. 18, 2014.
Extended European Search Report dated Jul. 7, 2017 in Patent Application No. 14871075.9.
Office Action dated May 16, 2017 in Japanese Patent Application No. 2015-553385 (with partial English translation).

* cited by examiner

POWER CONVERSION DEVICE

TECHNICAL FIELD

The present invention relates to a power conversion device for performing power conversion between plural-phase AC and DC, and particularly, to a large-capacity power conversion device with multiplexed converters.

BACKGROUND ART

In a modular multilevel converter (MMC) having a plurality of converters in series or parallel in a multiplexed manner to achieve a large capacity, a plurality of converter cells are connected in cascade to form arms.

In a voltage-type converter connected to an AC voltage source such as a power grid, if AC voltage outputted from the power converter is greatly different from the voltage of the AC voltage source when the voltage-type converter is interconnected with the grid, overcurrent flows in the voltage-type power converter. Therefore, for connecting an MMC that is a voltage-type power converter to an AC voltage source, not only a DC capacitor in each converter cell needs to be charged, but also the MMC needs to output voltage almost equal to the grid voltage (for example, see Patent Document 1).

Therefore, in a conventional power conversion device with an MMC configuration, it is general to initially charge a DC capacitor in each converter cell at the time of startup. In some methods for initially charging the DC capacitor, the DC capacitor is charged via a charge resistor from the AC grid (for example, see Patent Document 2 and Patent Document 3).

CITATION LIST

Patent Document

Patent Document 1: Japanese Laid-Open Patent Publication No. 2011-24392
Patent Document 2: International Publication No. WO2012/159668
Patent Document 3: International Publication No. WO2012/140008

SUMMARY OF THE INVENTION

Problems to be Solved by the Invention

When each DC capacitor in the power conversion device is initially charged via the charge resistor from the AC grid, the charge current flows via arms for two phases of the power conversion device. Therefore, the DC capacitors for two phases are connected in series and charged with the voltage of the AC grid, and it is difficult to charge each DC capacitor to a required voltage level.

The present invention has been made to solve the above problems, and an object of the present invention is to obtain a power conversion device capable of easily performing initial charging of a DC capacitor in each converter cell to a required voltage level at the time of startup.

Solution to the Problems

A power conversion device according to the present invention performs power conversion between plural-phase AC and DC, and includes a plurality of leg circuits each including a positive arm and a negative arm connected in series such that a connection point therebetween is connected to an AC circuit via each phase AC line, the leg circuits being connected in parallel between positive and negative DC buses. Each of the positive arm and the negative arm in each leg circuit includes at least one first converter cell connected in series. Each first converter cell includes: two series units connected in parallel and each composed of a plurality of semiconductor switching elements connected in series to each other; and a DC capacitor connected in parallel to the series units. One of connection portions between the plurality of semiconductor switching elements in each series unit is used as an output end. The power conversion device further includes a charge control unit for controlling initial charging of the DC capacitor in each first converter cell. The charge control unit includes, for each first converter cell, an element driving unit for driving, as a startup element, one of the plurality of semiconductor switching elements in the first converter cell, the element driving unit turning on the startup element when the DC capacitor is initially charged.

Effect of the Invention

Owing to the above configuration, the power conversion device according to the present invention can easily perform initial charging of the DC capacitor in each first converter cell to a required voltage level at the time of startup of the power conversion device. Therefore, when the power conversion device is connected to the AC circuit, voltage required on the AC side can be swiftly outputted.

DESCRIPTION OF EMBODIMENTS

Embodiment 1

Figure 1:
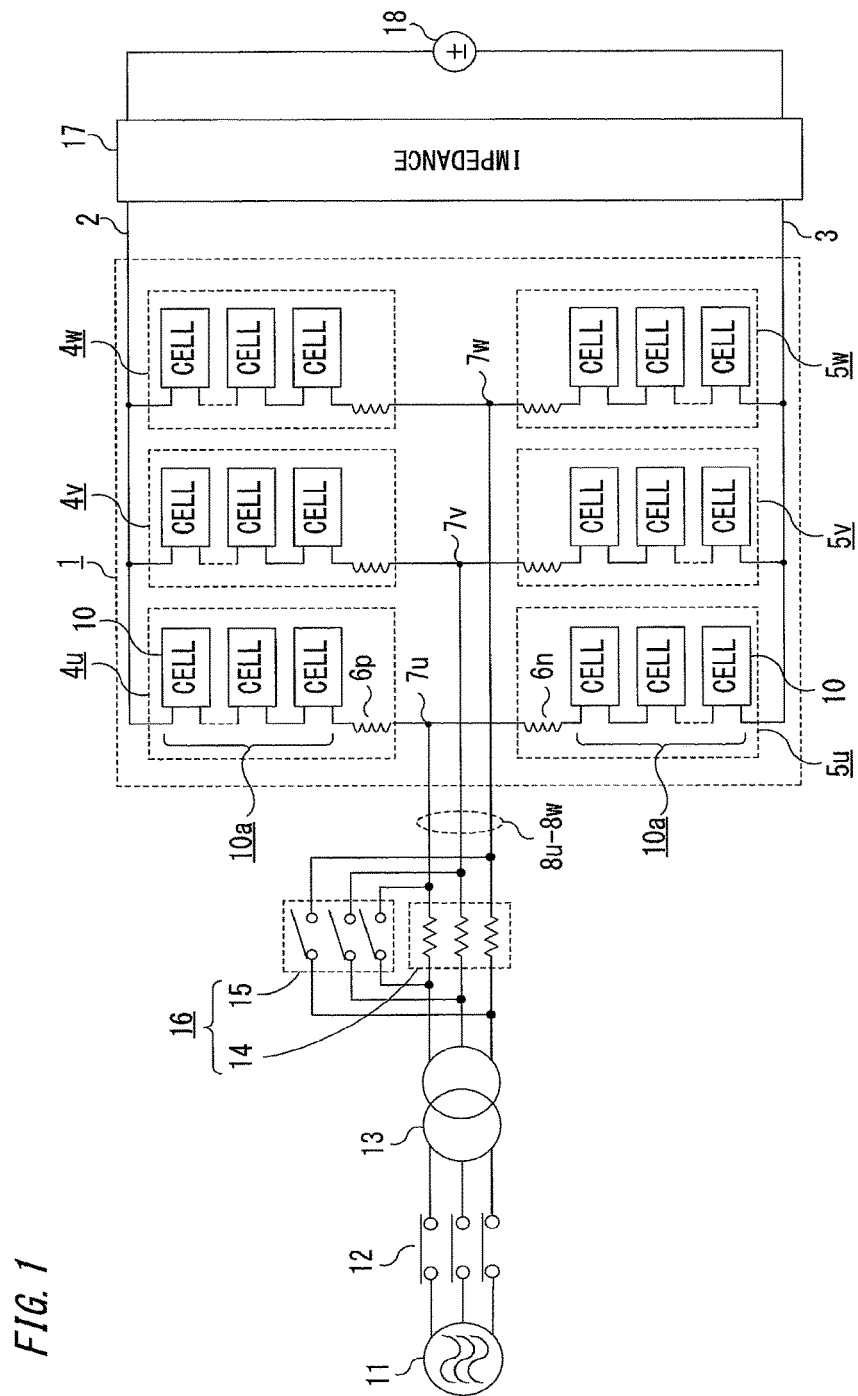
FIG. 1 is a circuit diagram showing a configuration example of a power conversion device according to embodiment 1 of the present invention.

Hereinafter, a power conversion device according to embodiment 1 of the present invention will be described based on the drawings. FIG. 1 is a circuit diagram showing a configuration example of the power conversion device according to embodiment 1 of the present invention.

As shown in FIG. 1, a power conversion device 1 performs power conversion between plural-phase AC, in this case, three-phase AC, and DC, and the AC side of the power conversion device 1 is connected via phase AC lines 8u to 8w to an AC power supply 11 which is a grid as an AC circuit with a plurality of phases. In this case, between the AC power supply 11 and the power conversion device 1, from the AC power supply 11 side, a circuit breaker 12 for grid interconnection, an interconnection transformer 13, and a charging circuit 16 composed of a charge resistor 14 and a bypass switch 15 connected in parallel to the charge resistor 14, are connected. That is, the power conversion device 1 is connected to the AC power supply 11 via the circuit breaker 12, the interconnection transformer 13, and the charging circuit 16. The DC side of the power conversion device 1 is connected to the DC power supply 18 via an impedance 17.

Instead of the interconnection transformer 13, an interconnection reactor may be provided. The DC side of the power conversion device 1 may be connected to a DC load, or may be connected to another power conversion device that performs DC output.

The respective phases of the power conversion device 1 are formed by leg circuits in which positive arms 4u to 4w and negative arms 5u to 5w are connected in series, and the connection points therebetween, i.e., AC ends 7u to 7w are connected to respective phase AC lines 8u to 8w. The three leg circuits are connected in parallel between the positive and negative DC buses 2 and 3.

The positive arms 4u to 4w and the negative arms 5u to 5w in the leg circuits each include a cell group 10a composed of one or more first converter cells (hereinafter, referred to as converter cells 10) connected in series, and a positive reactor 6p and a negative reactor 6n are inserted in series therebetween. In this case, the positive reactors 6p and the negative reactors 6n are inserted on the AC ends 7u to 7w sides of the cell groups 10a, but may be inserted at any positions in the arms 4u to 4w and 5u to 5w, or a plurality of such reactors may be provided in each arm.

Figure 2:
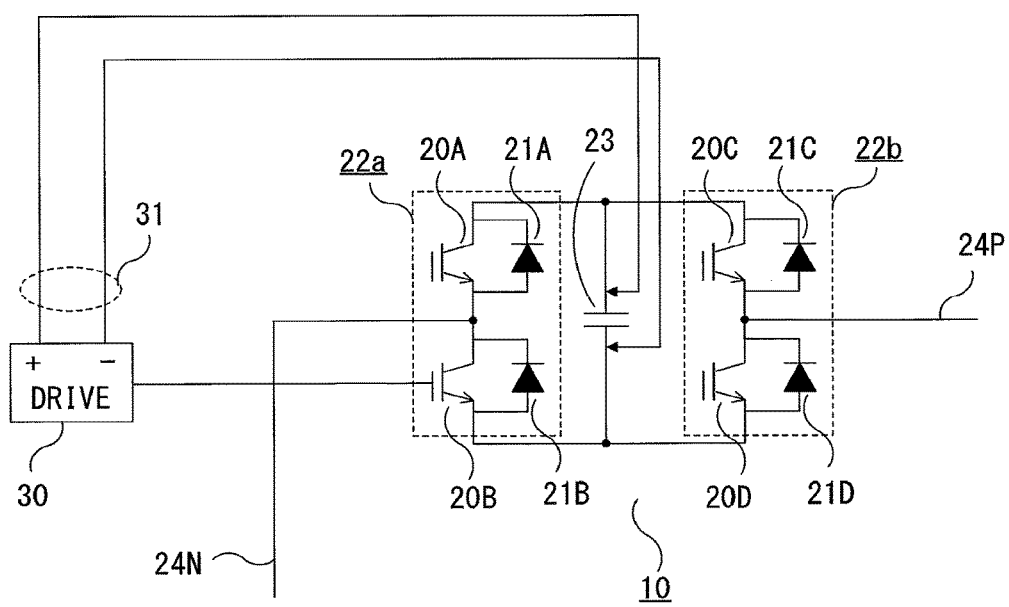
FIG. 2 is a circuit diagram showing the configuration of a converter cell and a charge control configuration for a DC capacitor according to embodiment 1 of the present invention.

As shown in FIG. 2, each converter cell 10 has a full-bridge configuration in which two series units 22a and 22b are connected in parallel and a DC capacitor 23 for smoothing DC voltage is connected in parallel to the series units 22a and 22b. The series unit 22a on the low voltage side is composed of a plurality of (in this case, two) semiconductor switching elements (hereinafter, referred to as switching elements) 20A and 21B which are connected in series and to which diodes 21A and 21B are connected in antiparallel. The series unit 22b on the high voltage side is composed of a plurality of (in this case, two) switching elements 20C and 20D which are connected in series and to which diodes 21C and 21D are connected in antiparallel. The switching elements 20A to 20D are formed of self-turn-off switching elements such as IGBTs (Insulated Gate Bipolar Transistors) or GCTs (Gate Commutated Turn-off thyristors), to which the diodes 21A to 21D are connected in antiparallel.

In each converter cell 10, the intermediate connection points in the series units 22a and 22b are used as output ends, and during operation of the power conversion device 1, the switching elements 20A to 20D are turned on and off, whereby positive voltage and negative voltage at both ends of the DC capacitor 23 and zero voltage are outputted from the output ends. In this case, the output end in the series unit 22a on the low voltage side is the connection portion between the switching elements 20A and 21B, and is connected to an output line 24N. The output end in the series unit 22b on the high voltage side is the connection portion between the switching elements 20C and 21D, and is connected to an output line 24P.

The power conversion device 1 includes a charge control unit for initially charging the DC capacitor 23 in each converter cell 10 at the time of startup of the power conversion device 1. In this case, each converter cell 10 is provided with an element driving unit 30 for initially charging the DC capacitor 23, and the element driving unit 30 constitutes the charge control unit. The element driving unit 30 turns on one switching element 20B in the converter cell 10 as a startup element when the DC capacitor 23 in each converter cell 10 is initially charged, and is supplied with power via a power feed line 31 from the DC capacitor 23. When the voltage (hereinafter, referred to as capacitor voltage Vc) of the DC capacitor 23 has exceeded startup voltage Vsh determined from the specifications of the element driving unit 30, the element driving unit 30 can turn on the startup element (switching element 20B).

The startup element may be another switching element 20A, 20C, 20D, and may be arbitrarily selected. In this case, since the switching element 20B is used as the startup element, hereinafter, the switching element 20B is referred to as a startup element 20B.

Next, charge control operation for initially charging the DC capacitor 23 in each converter cell 10 at the time of startup of the power conversion device 1 will be described based on a flowchart shown in FIG. 3.

Before the power conversion device 1 is interconnected to the AC power supply (grid) 11, all the switching elements 20A to 20D in each converter cell 10 are OFF.

In startup of the power conversion device 1, when the circuit breaker 12 for grid interconnection is closed, charge current i flows from the AC power supply 11 via the charging circuit 16, whereby operation for initially charging the DC capacitor 23 in each converter cell 10 is started. At this time, the bypass switch 15 of the charging circuit 16 is OFF, and the charge current i flows through the charge resistor 14 (s1).

In the element driving unit 30, the capacitor voltage Vc of the DC capacitor 23 which is the power supply is detected, and when the capacitor voltage Vc has increased to exceed the startup voltage Vsh set in the element driving unit 30 (s2), the element driving unit 30 turns on the startup element 20B (s3).

Figure 4:
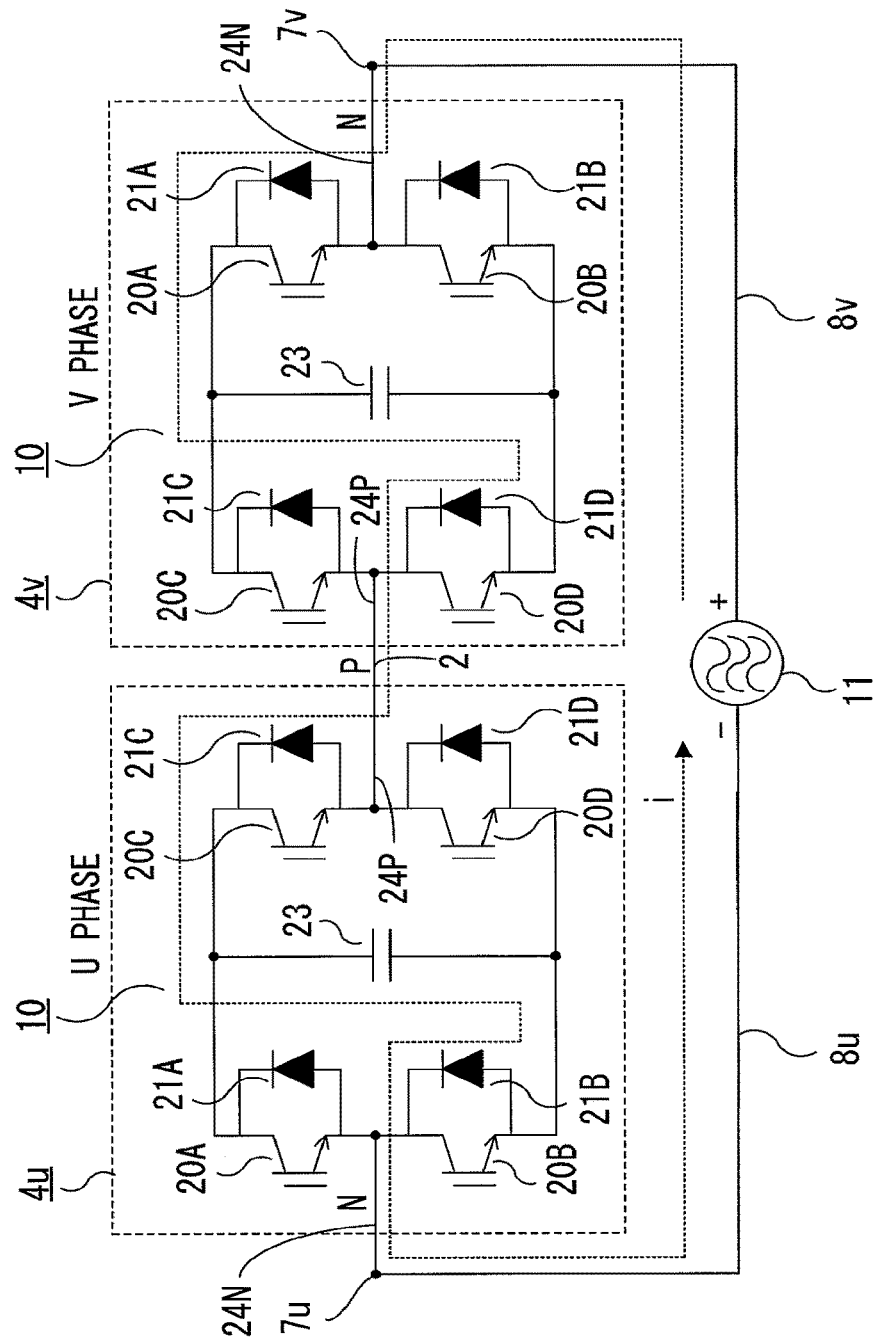
FIG. 4 is a circuit diagram for explaining charge control operation for the DC capacitor according to embodiment 1 of the present invention.
Figure 5:
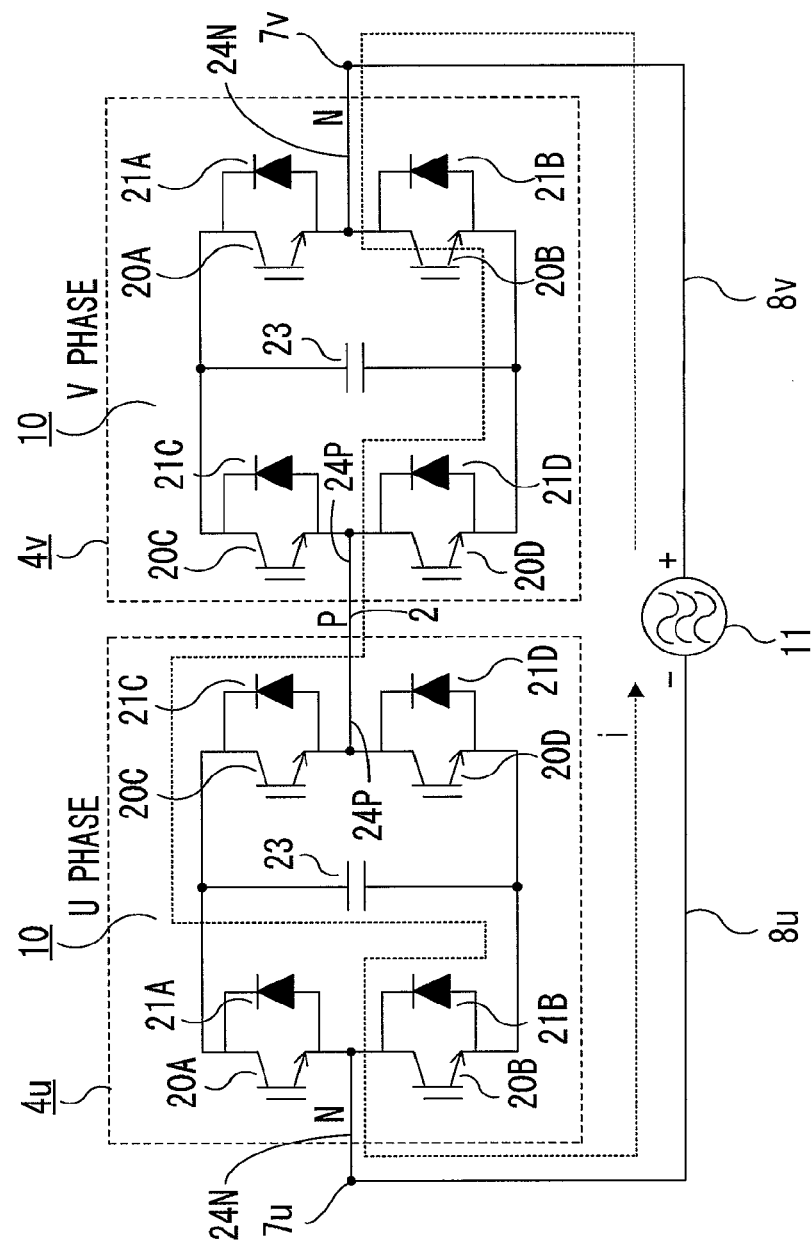
FIG. 5 is a circuit diagram for explaining charge control operation for the DC capacitor according to embodiment 1 of the present invention.

Thus, the charge control operation for initially charging the DC capacitor 23 in each converter cell 10 is a two-stage operation including a period in which the capacitor voltage Vc is equal to or lower than the startup voltage Vsh and a period in which the capacitor voltage Vc exceeds the startup voltage Vsh. FIG. 4 and FIG. 5 show routes of the charge current i in the respective periods. The charge current i flows via two phases (UV, VW, WU) of the positive arms 4u to 4w or two phases (UV, VW, WU) of the negative arms 5*u* to 5*w*. In FIG. 4 and FIG. 5, the charge current i flows via the U-phase positive arm 4*u* and the V-phase positive arm 4*v*. For convenience sake, the number of the converter cells 10 in each of the positive arms 4*u* and 4*v* is one. Although not shown, the bypass switch 15 is OFF and the charge current i flows through the charge resistor 14.

During the period in which the capacitor voltage Vc is equal to or lower than the startup voltage Vsh, all the switching elements 20A to 20D in each converter cell 10 are OFF, and the charge current i flows as shown in FIG. 4.

In this case, the charge current i from the AC power supply 11 flows through the AC power supply 11, the V-phase AC end 7*v*, the V-phase positive arm 4*v*, the positive-side DC bus 2, the U-phase positive arm 4*u*, the U-phase AC end 7*u*, and then the AC power supply 11.

In the converter cell 10 in the V-phase positive arm 4*v*, the charge current i flows through the diode 21A, the DC capacitor 23, and then the diode 21D to charge the DC capacitor 23 in the positive arm 4*v*. On the other hand, in the converter cell 10 in the U-phase positive arm 4*u*, the charge current i flows through the diode 21C, the DC capacitor 23, and then the diode 21B to charge the DC capacitor 23 in the positive arm 4*u*.

Thus, the charge current i flows through such a route that connects in series the DC capacitors 23 in the positive arms 4*u* and 4*v* for two phases, and charges the DC capacitors 23 in the U-phase and V-phase positive arms 4*u* and 4*v* simultaneously.

During this period, each DC capacitor 23 can be charged irrespective of the polarity of the power supply voltage, so that the capacitor voltage Vc gradually increases.

During the period in which the capacitor voltage Vc exceeds the startup voltage Vsh, only the startup element 20B in each converter cell 10 is turned on, while the other switching elements 20A, 20C, and 20D are kept off, and the charge current i flows as shown in FIG. 5.

In this case, the charge current i from the AC power supply 11 flows through the AC power supply 11, the V-phase AC end 7*v*, the V-phase positive arm 4*v*, the positive-side DC bus 2, the U-phase positive arm 4*u*, the U-phase AC end 7*u*, and then the AC power supply 11.

In the converter cell 10 in the V-phase positive arm 4*v*, the charge current i flows through the startup element 20B and then the diode 21D, thus bypassing the DC capacitor 23 in the positive arm 4*v*. On the other hand, in the converter cell 10 in the U-phase positive arm 4*u*, the charge current i flows through the diode 21C, the DC capacitor 23, and then the diode 21B to charge the DC capacitor 23 in the positive arm 4*u*.

Thus, the charge current i flowing through the positive arms 4*u* and 4*v* for two phases charges only the DC capacitor 23 in the U-phase positive arm 4*u*.

During this period, when the polarity of the power supply voltage is reversed, only the DC capacitor 23 in the V-phase positive arm 4*v* is charged.

As described above, when all the switching elements 20A to 20D are OFF, the DC capacitors 23 are charged through such a route that connects in series the DC capacitors 23 in the positive arms 4*u* and 4*v* for two phases. Therefore, the power supply voltage is divided by the DC capacitors 23 in the positive arms 4*u* and 4*v* for two phases, and the capacitor voltages Vc cannot be increased beyond the divided voltage. If the number of the converter cells 10 in each of the positive arms 4*u* and 4*v* is one, each capacitor voltage Vc can be increased to only about half the peak value of the power supply voltage.

In the present embodiment, when the capacitor voltage Vc has exceeded the startup voltage Vsh set in the element driving unit 30, the element driving unit 30 turns on the startup element 20B. Thus, the route of the charge current i is changed and only the DC capacitor 23 in the U-phase positive arm 4*u* is charged. Therefore, the power supply voltage is not divided by two phases. If the number of the converter cells 10 in each of the positive arms 4*u* and 4*v* is one, each capacitor voltage Vc can be increased to almost the peak value of the power supply voltage.

Thus, at the time of startup of the power conversion device 1, the DC capacitor 23 can be charged to desired voltage, and the power conversion device 1 swiftly becomes able to output desired AC voltage. Therefore, trouble such as occurrence of overcurrent when the power conversion device 1 is interconnected to the AC power supply (grid) 11 can be resolved, and reliability of the power conversion device 1 can be improved.

Since the element driving unit 30 turns on the startup element 20B on the basis of the capacitor voltage Vc fed thereto as a power supply, fast response can be performed and initial charging can be swiftly performed.

Embodiment 2

Figure 6:
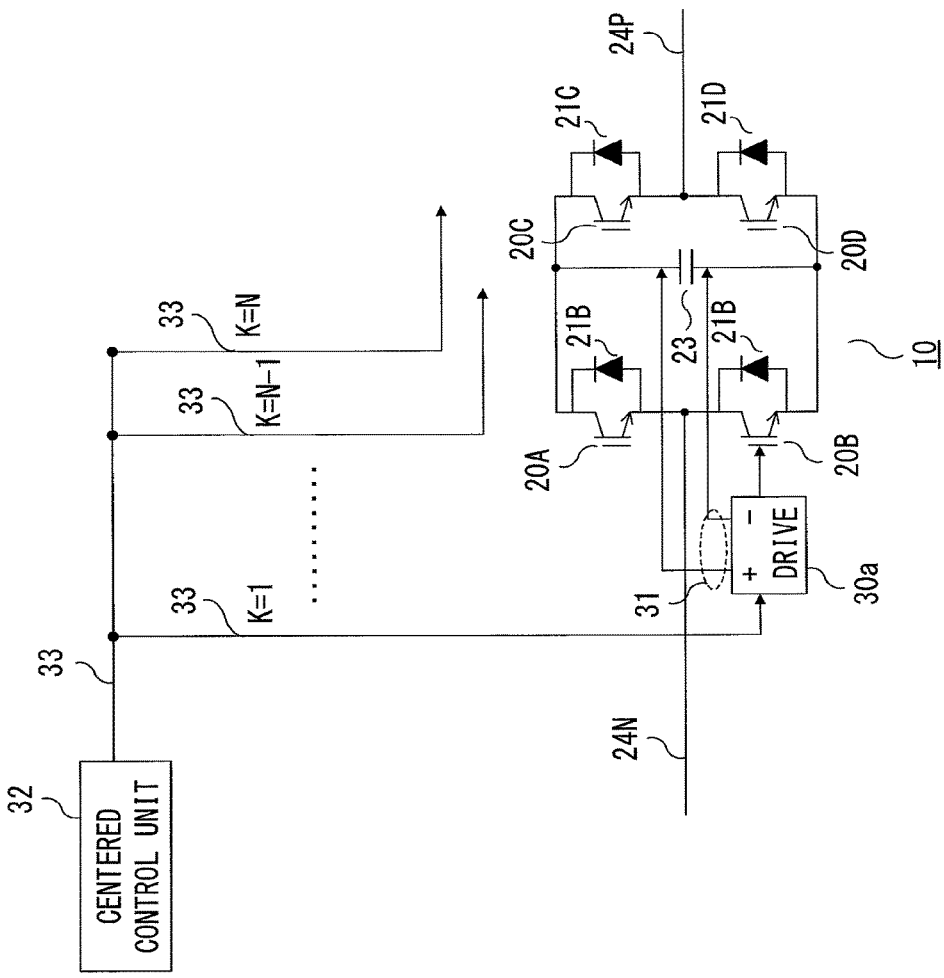
FIG. 6 is a circuit diagram showing the configuration of a converter cell and a charge control configuration for a DC capacitor according to embodiment 2 of the present invention.

Next, based on FIG. 6, a power conversion device according to embodiment 2 of the present invention will be described below.

In the present embodiment, the main circuit configuration of the power conversion device 1 is the same as that shown in FIG. 1 in the above embodiment 1, but the charge control unit for initially charging the DC capacitor 23 in each converter cell 10 at the time of startup of the power conversion device 1 is different. In this case, the number of the converter cells 10 in the power conversion device 1 is N. The charge control unit includes: an element driving unit 30*a* provided for each converter cell 10, for initially charging the DC capacitor 23 in the converter cell 10; and a central control unit 32 for outputting a turn-on command 33 to start ON control for each startup element 20B simultaneously, to all (N) the element driving units 30*a*.

As in the above embodiment 1, at the time of initially charging the DC capacitor 23 in each converter cell 10, the element driving unit 30*a* turns on one switching element 20B in the converter cell 10 as a startup element, and is supplied with power via the power feed line 31 from the DC capacitor 23. When the capacitor voltage Vc has exceeded the startup voltage Vsh, the element driving unit 30*a* can turn on the startup element 20B. Also in the present embodiment, the startup element may be another switching element 20A, 20C, 20D.

The central control unit 32 may be supplied with power from the main circuit of the power conversion device 1, or from the outside.

Figure 7:
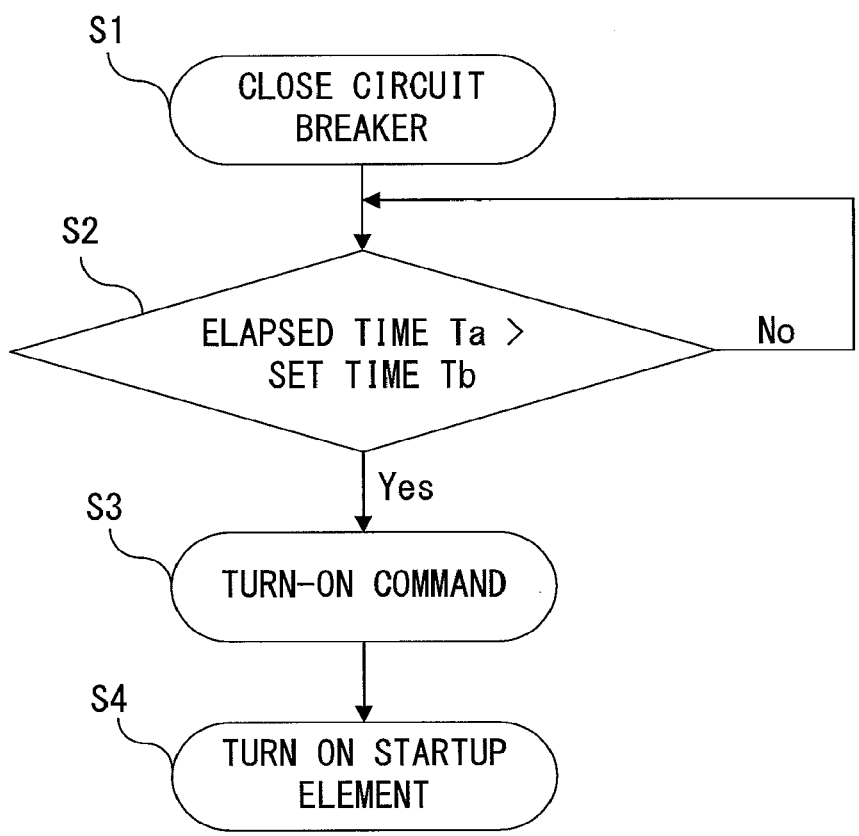
FIG. 7 is a flowchart showing charge control operation for the DC capacitor according to embodiment 2 of the present invention.

Next, charge control operation for initially charging the DC capacitor 23 in each converter cell 10 at the time of startup of the power conversion device 1 will be described based on a flowchart shown in FIG. 7.

Before the power conversion device 1 is interconnected to the AC power supply (grid) 11, all the switching elements 20A to 20D in each converter cell 10 are OFF.

At the time of startup of the power conversion device 1, when the circuit breaker 12 for grid interconnection is closed, the charge current i flows from the AC power supply 11 via the charging circuit 16. Thus, as in the above embodiment 1, operation for initially charging the DC capacitor 23 in each converter cell 10 is started (S1).

The capacitor voltage Vc of the DC capacitor 23 increases as time elapses. The central control unit 32 measures an elapsed time Ta since the circuit breaker 12 has been closed, and when the elapsed time Ta has exceeded a predetermined time (set time Tb) (S2), the turn-on command 33 to start ON control for each startup element 20B simultaneously is outputted to all the element driving units 30a (S3).

When having received the turn-on command 33, each element driving unit 30a turns on the startup element 20B (S4).

In this case, the central control unit 32 stores, as the set time Tb in advance, a time that is equal to or slightly longer than a time taken until the capacitor voltage Vc exceeds the startup voltage Vsh of the element driving unit 30a since the circuit breaker 12 has been closed. The set time Tb is variable.

Also in the present embodiment, the charge control operation for initially charging the DC capacitor 23 in each converter cell 10 is a two-stage operation including a period in which all the switching elements 20A to 20D are OFF, and a period in which the elapsed time Ta since the circuit breaker 12 has been closed exceeds the set time Tb and the startup element 20B is turned on. The routes of the charge current i in the respective periods are the same as those shown in FIG. 4 and FIG. 5 in the above embodiment 1.

As in the above embodiment 1, by the element driving unit 30a turning on the startup element 20B, the route of the charge current i is changed, so that the power supply voltage is not divided by two phases. Thus, at the time of startup of the power conversion device 1, the DC capacitor 23 can be charged to desired voltage, and the power conversion device 1 swiftly becomes able to output desired AC voltage. Therefore, trouble such as occurrence of overcurrent when the power conversion device 1 is interconnected to the AC power supply (grid) 11 can be resolved, and reliability of the power conversion device 1 can be improved.

The element driving unit 30a does not need to detect the capacitor voltage Vc, and the device configuration can be downsized and simplified.

The central control unit 32 outputs the turn-on command 33 on the basis of only comparison between the elapsed time Ta since the circuit breaker 12 has been closed and the set time Tb. Therefore, calculation processing is simplified, whereby the device configuration can be downsized and simplified.

When the element driving unit 30a receives the turn-on command 33, if the capacitor voltage Vc of the DC capacitor 23 is equal to or lower than the startup voltage Vsh, the startup element 20B in the converter cell 10 having the DC capacitor 23 is not turned on. However, the charge current i flows via the diodes 21A to 21D to charge the DC capacitor 23, and the capacitor voltage Vc increases. Then, when the capacitor voltage Vc has exceeded the startup voltage Vsh, the startup element 20B is turned on, and thus there is no problem.

Embodiment 3

Figure 8:
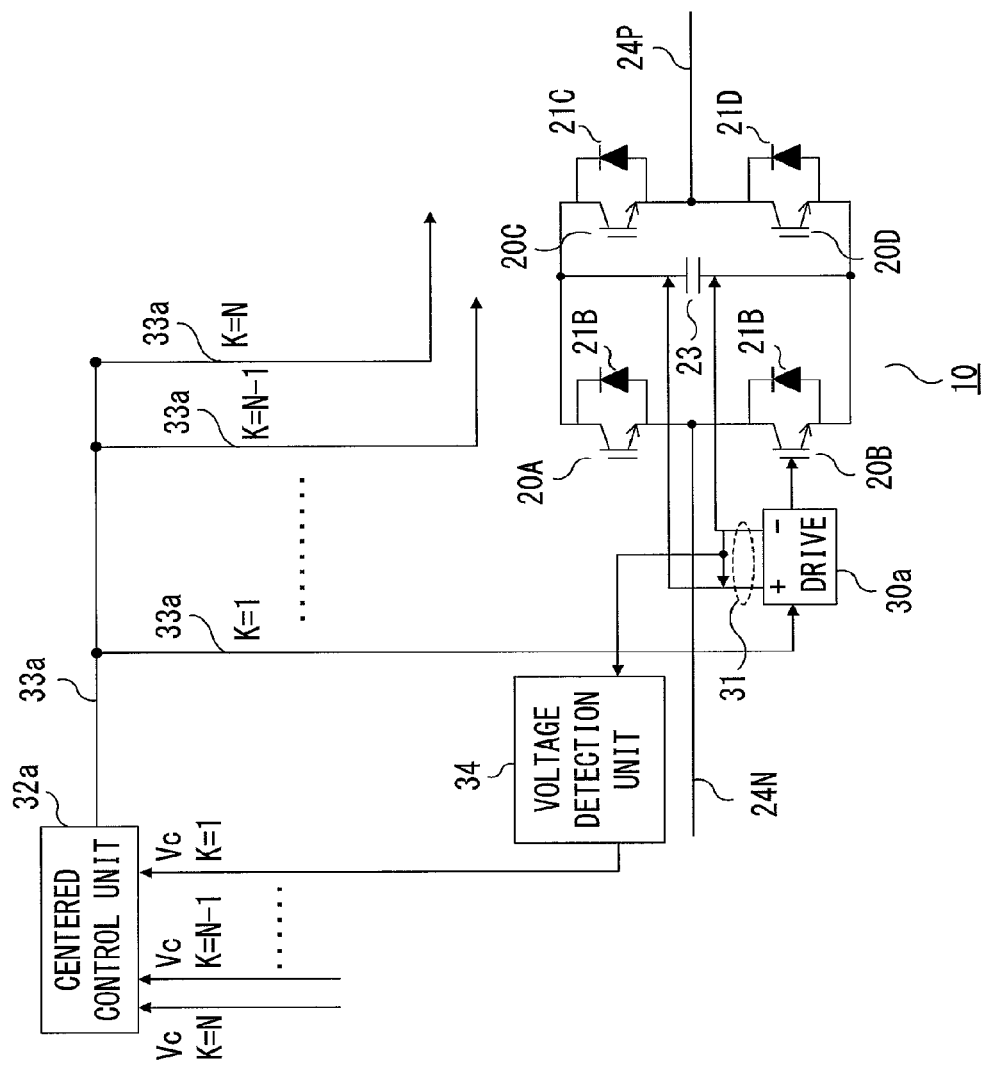
FIG. 8 is a circuit diagram showing the configuration of a converter cell and a charge control configuration for a DC capacitor according to embodiment 3 of the present invention.

Next, based on FIG. 8, a power conversion device according to embodiment 3 of the present invention will be described below.

Also in the present embodiment, the main circuit configuration of the power conversion device 1 is the same as that shown in FIG. 1 in the above embodiment 1.

The charge control unit for initially charging the DC capacitor 23 in each converter cell 10 at the time of startup of the power conversion device 1 includes, for each converter cell 10, the element driving unit 30a and a voltage detection unit 34 for detecting the capacitor voltage Vc, and further includes a central control unit 32a for outputting a turn-on command 33a to start ON control for each startup element 20B simultaneously, to all (N) the element driving units 30a.

As in the above embodiment 2, at the time of initially charging the DC capacitor 23 in each converter cell 10, the element driving unit 30a turns on one switching element 20B in the converter cell 10 as a startup element, and is supplied with power via the power feed line 31 from the DC capacitor 23. When the capacitor voltage Vc has exceeded the startup voltage Vsh, the element driving unit 30a can turn on the startup element 20B. Also in the present embodiment, the startup element may be another switching element 20A, 20C, 20D.

The central control unit 32a and the voltage detection unit 34 may be supplied with power from the main circuit of the power conversion device 1, or from the outside.

Figure 9:
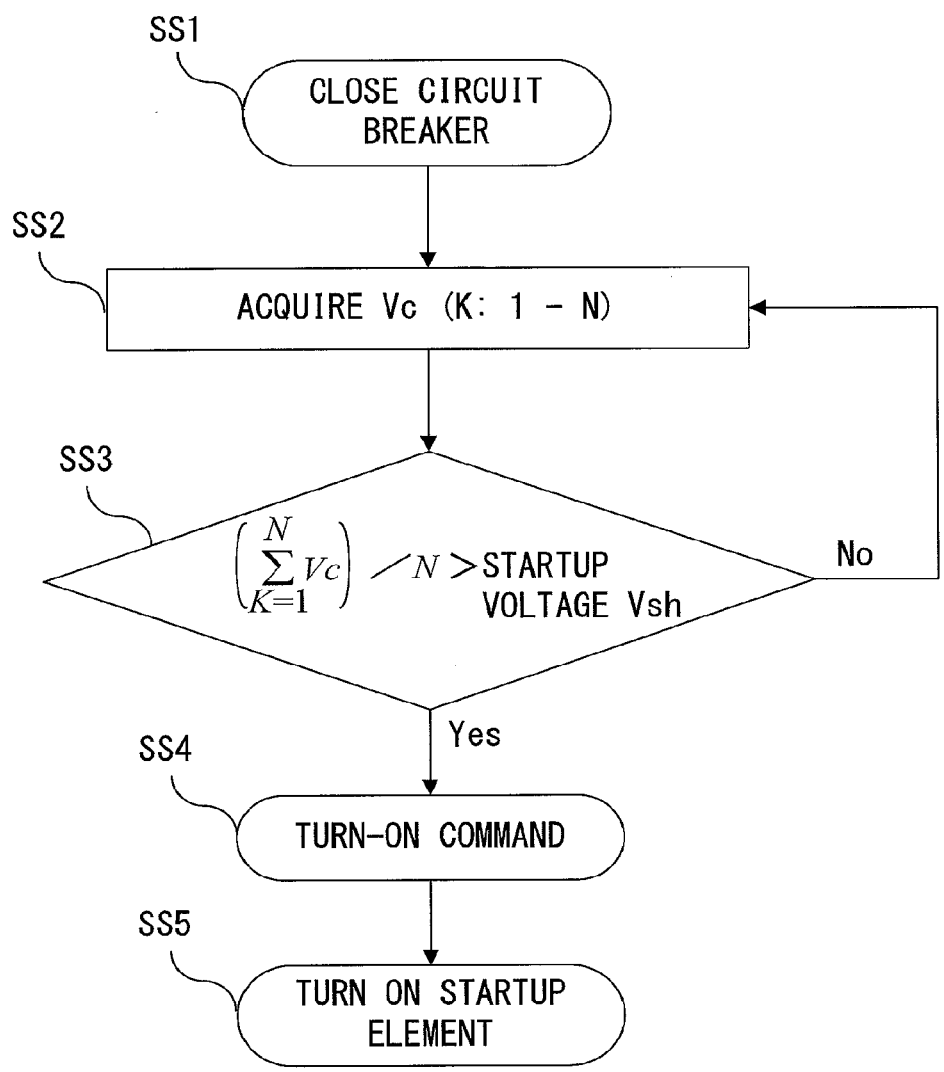
FIG. 9 is a flowchart showing charge control operation for the DC capacitor according to embodiment 3 of the present invention.

Next, charge control operation for initially charging the DC capacitor 23 in each converter cell 10 at the time of startup of the power conversion device 1 will be described based on a flowchart shown in FIG. 9.

Before the power conversion device 1 is interconnected to the AC power supply (grid) 11, all the switching elements 20A to 20D in each converter cell 10 are OFF.

At the time of startup of the power conversion device 1, when the circuit breaker 12 for grid interconnection is closed, the charge current i flows from the AC power supply 11 via the charging circuit 16. Thus, as in the above embodiment 1, operation for initially charging the DC capacitor 23 in each converter cell 10 is started (SS1).

The capacitor voltage Vc of the DC capacitor 23 in each converter cell 10 is detected by the voltage detection unit 34. The central control unit 32a acquires and monitors all (N) the capacitor voltages Vc (SS2), and when the average value ($\Sigma Vc/N$) thereamong has exceeded the startup voltage Vsh (SS3), outputs the turn-on command 33a to start ON control for each startup element 20B simultaneously, to all the element driving units 30a (SS4).

When having received the turn-on command 33a, each element driving unit 30a turns on the startup element 20B (SS5).

Also in the present embodiment, the charge control operation for initially charging the DC capacitor 23 in each converter cell 10 is a two-stage operation including a period in which all the switching elements 20A to 20D are OFF, and a period in which the average value among all the capacitor voltages Vc exceeds the startup voltage Vsh and the startup element 20B is turned on. The routes of the charge current i in the respective periods are the same as those shown in FIG. 4 and FIG. 5 in the above embodiment 1.

As in the above embodiment 1, by the element driving unit 30a turning on the startup element 20B, the route of the charge current i is changed, so that the power supply voltage is not divided by two phases. Thus, at the time of startup of the power conversion device 1, the DC capacitor 23 can be charged to desired voltage, and the power conversion device 1 swiftly becomes able to output desired AC voltage. Therefore, trouble such as occurrence of overcurrent when the power conversion device 1 is interconnected to the AC power supply (grid) 11 can be resolved, and reliability of the power conversion device 1 can be improved.

In the present embodiment, when the element driving units 30a have received the turn-on command 33a, there are some DC capacitors 23 whose capacitor voltages Vc are equal to or lower than the startup voltage Vsh. In the converter cell 10 having such a DC capacitor 23, the startup element 20B is not turned on immediately after the turn-on command 33a is received. However, the charge current i flows via the diodes 21A to 21D to charge the DC capacitor 23, and the capacitor voltage Vc increases. Then, when the capacitor voltage Vc has exceeded the startup voltage Vsh, the startup element 20B is turned on, and thus there is no problem.

Embodiment 4

In the above embodiment 3, the central control unit 32a outputs the turn-on command 33a when the average value ($\Sigma Vc/N$) among the capacitor voltages Vc exceeds the startup voltage Vsh. In the present embodiment, the central control unit 32a outputs the turn-on command 33a when all the capacitor voltages Vc exceed the startup voltage Vsh.

Figure 10:
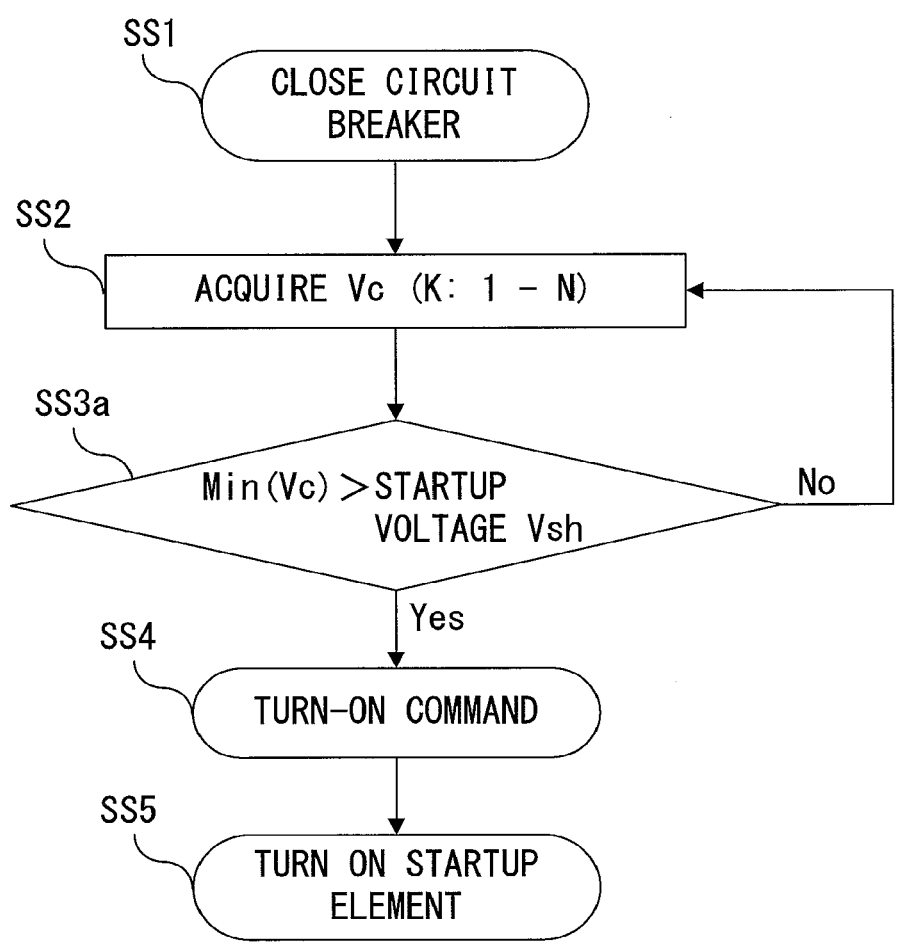
FIG. 10 is a flowchart showing charge control operation for a DC capacitor according to embodiment 4 of the present invention.

The charge control operation for initially charging the DC capacitor 23 in each converter cell 10 at the time of startup of the power conversion device 1 will be described based on a flowchart shown in FIG. 10.

Before the power conversion device 1 is interconnected to the AC power supply (grid) 11, all the switching elements 20A to 20D in each converter cell 10 are OFF.

In startup of the power conversion device 1, when the circuit breaker 12 for grid interconnection is closed, the charge current i flows from the AC power supply 11 via the charging circuit 16. Thus, as in the above embodiment 1, operation for initially charging the DC capacitor 23 in each converter cell 10 is started (SS1).

The capacitor voltage Vc of the DC capacitor 23 in each converter cell 10 is detected by the voltage detection unit 34. The central control unit 32a acquires and monitors all (N) the capacitor voltages Vc (SS2), and when the minimum capacitor voltage Min(Vc) thereamong has exceeded the startup voltage Vsh (SS3a), outputs the turn-on command 33a to start ON control for each startup element 20B simultaneously, to all the element driving units 30a (SS4).

When having received the turn-on command 33a, each element driving unit 30a turns on the startup element 20B (SS5).

In this case, only the operation in step SS3a is different from that in the above embodiment 3, but the other configuration is the same as in the above embodiment 3, and the same effect as in the above embodiment 3 is obtained.

In the present embodiment, when the element driving units 30a have received the turn-on command 33a, the capacitor voltages Vc have necessarily exceeded the startup voltage Vsh, and therefore all the startup elements 20B can be reliably turned on to charge the DC capacitors 23. Therefore, the capacitor voltages Vc can be prevented from being unbalanced among different converter cells 10, and occurrence of circulating current among the converter cells 10 can also be prevented. Thus, initial charging with high reliability can be achieved while evenness among the capacitor voltages Vc is kept.

Embodiment 5

Next, a power conversion device according to embodiment 5 of the present invention will be described below.

In the above embodiments 1 to 4, the element driving units 30, 30a for driving the startup elements 20B in the converter cells 10 are provided for all the phases. In the present embodiment, the element driving units 30, 30a for driving the startup elements 20B in the converter cells 10 are provided for only two phases of the three-phase power conversion device 1.

As an example, the power conversion device 1 in which the element driving units 30 as in the above embodiment 1 are provided for only V phase and W phase will be described. In this case, the converter cells 10 for U-phase are not provided with the element driving units 30.

Figure 3:
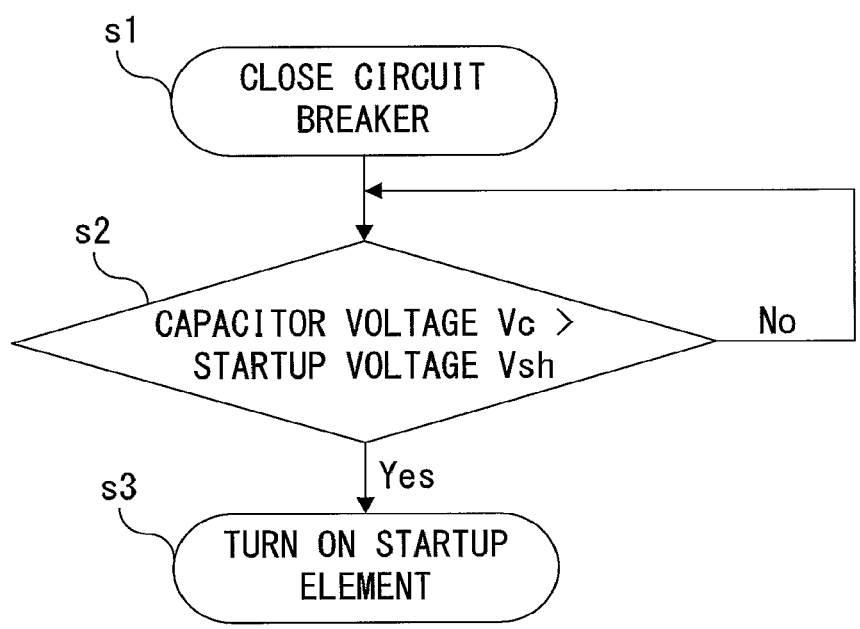
FIG. 3 is a flowchart showing charge control operation for the DC capacitor according to embodiment 1 of the present invention.

The charge control operation for initially charging the DC capacitor 23 in each converter cell 10 at the time of startup of the power conversion device 1 is the same as that shown in the flowchart in FIG. 3 in the above embodiment 1 as for V phase and W phase.

During the period in which the V-phase and W-phase capacitor voltages Vc are equal to or lower than the startup voltage Vsh, all the switching elements 20A to 20D in the converter cells 10 for all the phases are OFF, and therefore the charge current i flows in the same manner as in the above embodiment 1 (see FIG. 4).

Each element driving unit 30 for V phase and W phase detects the capacitor voltage Vc of the DC capacitor 23 which is the power supply, and when the capacitor voltage Vc has increased to exceed the startup voltage Vsh set in the element driving unit 30, turns on the startup element 20B.

At this time, while the startup elements 20B in the converter cells 10 for V phase and W phase are turned on, the charge current i flows to the DC capacitor 23 for U phase via the converter cell 10 for another phase, e.g., V-phase. Then, depending on the polarity of the power supply, the DC capacitor 23 for V phase is bypassed, and only the DC capacitor 23 for U phase is charged without the power supply voltage being divided by the two phases (see FIG. 5).

Meanwhile, the charge current i flowing between two phases of V phase and W phase bypasses the DC capacitor 23 for one of the phases depending on the polarity of the power supply, and the DC capacitors 23 for V phase and W phase are charged without the power supply voltage being divided by the two phases.

The charge current i flows via two phases (UV, VW, WU) of the positive arms 4u to 4w, or two phases (UV, VW, WU) of the negative arms 5u to 5w. Therefore, even if all the switching elements 20A to 20D in the converter cell 10 for one phase are OFF, the DC capacitor 23 for each phase can be charged to desired voltage as described above, and thus the same effect as in the above embodiment 1 is obtained.

Since the element driving units 30 are provided for only two phases of the three-phase power conversion device 1, the device configuration can be downsized and simplified.

In the above, an example in which the above embodiment 1 is applied has been described. However, the above embodiments 2 to 4 may be applied to provide the element driving units 30a for only two phases of the three-phase power conversion device 1. Also in this case, the same effect is obtained.

Embodiment 6

Figure 11:
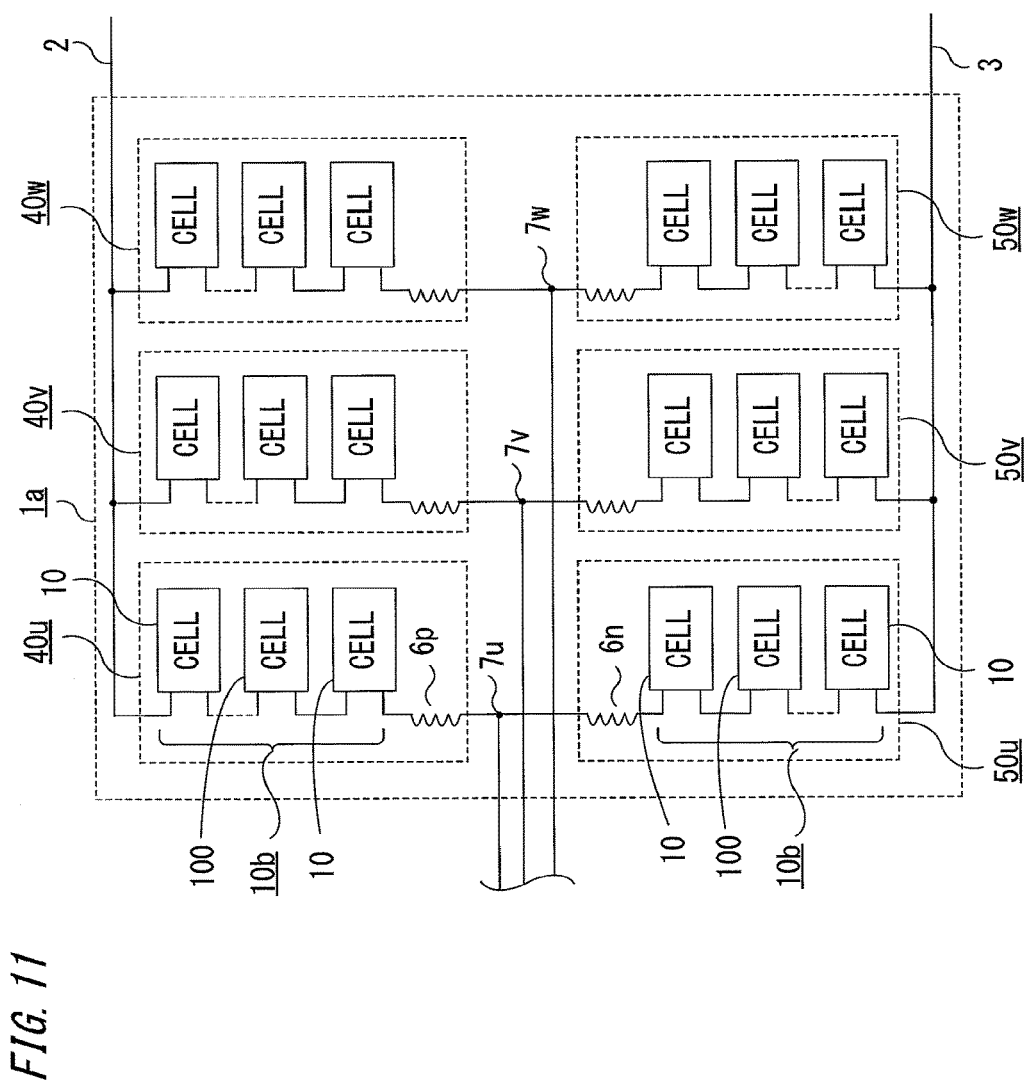
FIG. 11 is a circuit diagram showing a configuration example of a power conversion device according to embodiment 6 of the present invention.

Next, a power conversion device according to embodiment 6 of the present invention will be described below. FIG. 11 is a circuit diagram showing a configuration example of the power conversion device according to embodiment 6 of the present invention.

A power conversion device 1a performs power conversion between plural-phase AC, in this case, three-phase AC, and DC. As shown in FIG. 11, the respective phases of the power conversion device 1a are formed by leg circuits in which positive arms 40u to 40w and negative arms 50u to 50w are connected in series, and the connection points therebetween, i.e., the AC ends 7u to 7w are connected to the respective phase AC lines 8u to 8w. The three leg circuits are connected in parallel between the positive and negative DC buses 2 and 3.

The positive arms 40u to 40w and the negative arms 50u to 50w in the leg circuits each include a cell group 10b composed of one or more converter cells 10 and second converter cells 100 connected in series, and a positive reactor 6p and a negative reactor 6n are inserted in series therebetween. In this case, the positive reactors 6p and the negative reactors 6n are inserted on the AC ends 7u to 7w sides of the cell groups 10a, but may be inserted at any positions in the arms 40u to 40w and 50u to 50w, or a plurality of such reactors may be provided in each arm.

The other configuration is the same as that shown in FIG. 1 in the above embodiment 1. The power conversion device 1a is connected to the AC power supply 11 via the circuit breaker 12, the interconnection transformer 13, and the charging circuit 16. The DC side of the power conversion device 1a is connected to the DC power supply 18 via the impedance 17.

Figure 12:
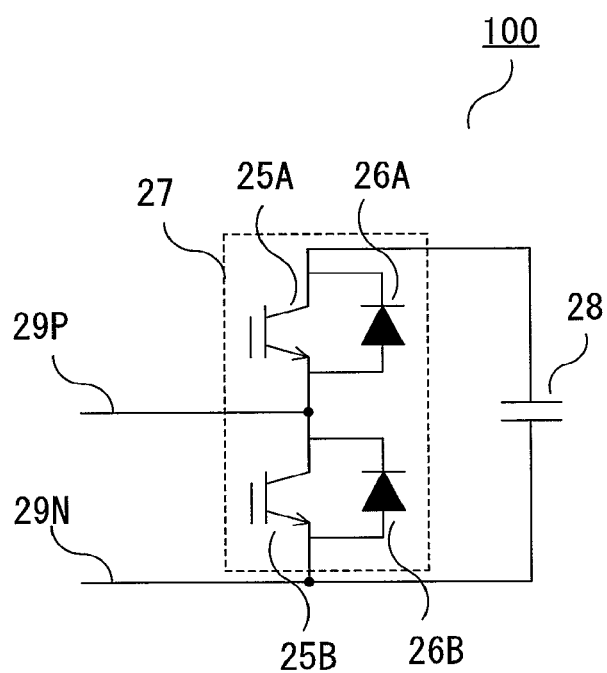
FIG. 12 is a circuit diagram showing the configuration of a second converter cell according to embodiment 6 of the present invention.

The configuration of each converter cell 10 is the same as in the above embodiment 1. FIG. 12 shows the configuration of each second converter cell 100.

The second converter cell 100 has a half-bridge configuration including: a series unit 27 composed of a plurality of (in this case, two) switching elements 25A and 25B to which diodes 26A and 26B are connected in antiparallel; and a DC capacitor 28 connected in parallel to the series unit 27 and smoothing the DC voltage. The switching elements 25A and 25B are formed of self-turn-off switching elements such as IGBTs or GCTs, to which the diodes 26A and 26B are connected in antiparallel.

In the second converter cell 100, both terminals of the switching element 25B which correspond to the connection portions between the switching elements 25A and 25B are used as output ends, and during operation of the power conversion device 1, the switching elements 25A and 25B are turned on and off, whereby the both-end voltage of the DC capacitor 28 and zero voltage are outputted from the output ends via output lines 29P and 29N.

The positive arms 40u to 40w and the negative arms 50u to 50w in the leg circuits each include one or more converter cells 10 and second converter cells 100 connected in series as described above. The number of the converter cells 10 and the number of the second converter cells 100 each only need to be one or more.

The power conversion device 1a includes a charge control unit for initially charging each DC capacitor 23, 27 at the time of startup of the power conversion device 1a. The element driving unit 30 as in the above embodiment 1 is provided for each converter cell 10, and the element driving unit 30 constitutes the charge control unit.

The element driving unit 30 turns on one switching element 20B in the converter cell 10 as a startup element when the DC capacitor 23 in the converter cell 10 and the DC capacitor 28 in the second converter cell 100 are initially charged, and is supplied with power via the power feed line 31 from the DC capacitor 23.

The charge control operation for initially charging the DC capacitors 23 and 27 at the time of startup of the power conversion device 1a is the same as that shown in the flowchart in FIG. 3 in the above embodiment 1.

Also in the present third embodiment, the charge control operation is a two-stage operation including a period in which all the switching elements 20A to 20D in the converter cell 10 are OFF and a period in which the capacitor voltage Vc in the converter cell 10 exceeds the startup voltage Vsh and the startup element 20B is turned on. During both periods, all the switching elements 25A and 25B in the second converter cell 100 are OFF.

The DC capacitor 23 in the converter cell 10 is initially charged in the same manner as in the above embodiment 1. The charge current i flowing through the converter cell 10 also flows to the second converter cell 100 connected in series to the converter cell 10.

In the second converter cell 100, the charge current i inputted from the output line 29P and outputted from the output line 29N charges the DC capacitor 28, and the charge current i inputted from the output line 29N and outputted from the output line 29P bypasses the DC capacitor 28.

Thus, in the second converter cell 100, charging and bypassing of the DC capacitor 28 are repeated depending on the polarity of the power supply, that is, the same operation as that of each converter cell 10 during the period in which the startup element 20B is turned on, is performed.

Therefore, the DC capacitor 28 in the second converter cell 100 can also be charged to desired voltage as in the DC capacitor 23 in the converter cell 10, and the same effect as in the above embodiment 1 is obtained.

Since the second converter cell 100 having a simple cell configuration is used in combination with the converter cell 10, and the element driving unit 30 is provided for only the converter cell 10, the device configuration can be downsized and simplified.

In the above, an example in which the above embodiment 1 is applied has been described. However, the above embodiments 2 to 5 may be applied, and also in this case, the same effect is obtained.

It is noted that, within the scope of the present invention, the above embodiments may be freely combined with each other, or each of the above embodiments may be modified or abbreviated as appropriate.

The invention claimed is:
1. A power conversion device for performing power conversion between plural-phase AC and DC, the power conversion device comprising a plurality of leg circuits each including a positive arm and a negative arm connected in series, the leg circuits being connected in parallel between positive and negative DC buses, wherein
each of the positive arm and the negative arm in each leg circuit includes at least one first converter cell connected in series, and
each first converter cell includes: two series units connected in parallel and each composed of two semiconductor switching elements connected in series to each other; and a DC capacitor connected in parallel to the series units, wherein one of connection portions between the two semiconductor switching elements in each series unit is used as an output end,
the power conversion device further comprising a charge control unit for controlling initial charging of the DC capacitor in each first converter cell, wherein
the charge control unit includes, for each first converter cell, an element driving unit for driving, as a startup element, one of four semiconductor switching elements in the two series units of the first converter cell, the element driving unit turning on only the startup element and having the other three semiconductor switching elements kept off when the DC capacitor is initially charged.

2. The power conversion device according to claim 1, wherein
 each of the positive arm and the negative arm further includes at least one second converter cell connected in series to the first converter cell,
 each second converter cell includes: a series unit composed of a plurality of semiconductor switching elements connected in series to each other; and a DC capacitor connected in parallel to the series unit, wherein two connection portions of the plurality of semiconductor switching elements are used as output ends, and
 when the charge control unit controls initial charging of the DC capacitor in each first converter cell, the DC capacitor in each second converter cell is initially charged in a state in which all the plurality of semiconductor switching elements in the second converter cell are OFF.

3. The power conversion device according to claim 1, wherein
 the plural-phase AC is three-phase AC, and
 the charge control unit includes, only for two phases of the three phases, the element driving unit for driving the startup element in each first converter cell.

4. The power conversion device according to claim 1, wherein
 each leg is connected to an AC circuit, and
 a charge current from the AC circuit flows via two phases of a same polarity arms to charge each DC capacitor in one of the two phases and bypass each DC capacitor in the other phase when the start-up element of each first converter is turned on.

5. The power conversion device according to claim 1, wherein
 each element driving unit is supplied with power from the DC capacitor in the corresponding first converter cell.

6. The power conversion device according to claim 5, wherein
 each element driving unit starts ON control for the corresponding startup element on the basis of voltage of the corresponding DC capacitor.

7. The power conversion device according to claim 5, wherein
 the charge control unit includes a central control unit for outputting a turn-on command to start ON control for each startup element simultaneously, to all the element driving units.

8. The power conversion device according to claim 7, wherein
 the central control unit outputs the turn-on command to all the element driving units after a set time has elapsed since initial charging of the DC capacitors has been started.

9. The power conversion device according to claim 7, wherein
 the central control unit monitors voltage of the DC capacitor in each first converter cell, and based on the monitored voltages, outputs the turn-on command to all the element driving units.

10. A power conversion device for performing power conversion between plural-phase AC and DC, the power conversion device comprising a plurality of leg circuits each including a positive arm and a negative arm connected in series, the leg circuits being connected in parallel between positive and negative DC buses, wherein
 each of the positive arm and the negative arm in each leg circuit includes at least one first converter cell and at least one second converter cell connected in series, and
 each first converter cell includes: two series units connected in parallel and each composed of a plurality of semiconductor switching elements connected in series to each other; and a DC capacitor connected in parallel to the series units, wherein one of connection portions between the plurality of semiconductor switching elements in each series unit is used as an output end,
 each second converter cell includes: a series unit composed of a plurality of semiconductor switching elements connected in series to each other; and a DC capacitor connected in parallel to the series unit, wherein two connection portions of the plurality of semiconductor switching elements are used as output ends,
 the power conversion device further comprising a charge control unit for controlling initial charging of the DC capacitor in each first converter cell, wherein
 the charge control unit includes, for each first converter cell, an element driving unit for driving, as a startup element, one of the plurality of semiconductor switching elements in the first converter cell, the element driving unit turning on the startup element when the DC capacitor in each first converter cell is initially charged, and
 when the charge control unit controls initial charging of the DC capacitor in each first converter cell, the DC capacitor in each second converter cell is initially charged in a state in which all the plurality of semiconductor switching elements in the second converter cell are OFF.

11. The power conversion device according to claim 10, wherein
 the plural-phase AC is three-phase AC, and
 the charge control unit includes, only for two phases of the three phases, the element driving unit for driving the startup element in each first converter cell.

12. The power conversion device according to claim 10, wherein
 each element driving unit is supplied with power from the DC capacitor in the corresponding first converter cell.

13. The power conversion device according to claim 12, wherein
 each element driving unit starts ON control for the corresponding startup element on the basis of voltage of the corresponding DC capacitor.

14. The power conversion device according to claim 12, wherein
 the charge control unit includes a central control unit for outputting a turn-on command to start ON control for each startup element simultaneously, to all the element driving units.

15. The power conversion device according to claim 14, wherein
 the central control unit outputs the turn-on command to all the element driving units after a set time has elapsed since initial charging of the DC capacitors has been started.

16. The power conversion device according to claim 14, wherein
 the central control unit monitors voltage of the DC capacitor in each first converter cell, and based on the monitored voltages, outputs the turn-on command to all the element driving units.

* * * * *